United States Patent [19]

Breitscheidel et al.

[11] 4,417,932

[45] Nov. 29, 1983

[54] PROCESS FOR THE CONTINUOUS PRODUCTION OF A LENGTH OF STRATIFIELD MATERIAL FROM FOAM PARTICLES

[75] Inventors: Hans-Ulrich Breitscheidel, Siegburg; Paul Spielau, Troisdorf-Eschmar; Franz-Werner Alfter, Siegburg, all of Fed. Rep. of Germany

[73] Assignee: Dynamit Nobel Aktiengesellschaft, Troisdorf, Fed. Rep. of Germany

[21] Appl. No.: 305,726

[22] Filed: Sep. 25, 1981

[30] Foreign Application Priority Data

Oct. 1, 9180 [DE] Fed. Rep. of Germany ....... 3037011

[51] Int. Cl.³ .......................... B29J 5/00; B32B 17/00; B32B 5/18; B29D 27/00
[52] U.S. Cl. .................................... 156/62.2; 156/242; 156/322; 156/499; 264/112; 264/126; 428/207; 428/240
[58] Field of Search ............... 264/109, 112, 113, 123, 264/126, 128, 45.4; 156/62.2, 628, 77–79, 242, 308.2, 322, 499; 428/158, 159, 160, 206, 304, 315, 207, 240, 245, 283, 403, 407

[56] References Cited

U.S. PATENT DOCUMENTS

| | | | |
|---|---|---|---|
| 2,987,102 | 6/1961 | Heinrichs | 428/206 UX |
| 3,488,411 | 1/1970 | Goldman | 264/126 X |
| 3,746,107 | 7/1973 | Hoegger | 156/62.2 X |
| 3,986,918 | 10/1976 | Berner | 156/497 |
| 3,992,501 | 11/1976 | Tatzel et al. | 264/126 |

FOREIGN PATENT DOCUMENTS 2032834 5/1980 United Kingdom .

*Primary Examiner*—William A. Powell
*Attorney, Agent, or Firm*—Antonelli, Terry & Wands

[57] ABSTRACT

A process for the continuous production of a sheeting of stratified material from synthetic resin foam particles especially particles of crosslinking polyethylene includes the steps of scattering foam particles onto a conveying means, preheating the foam particles during conveyance, superficially to a temperature in the range between 100° and 160° C.; thereafter feeding the thus-preheated foam particles to means defining a free falling zone; causing the preheated particle to free-fall within said zone; further heating the particles during falling, to a temperature of at least 200° C., and, at the end of the free fall, piling up the particles on a support surface; compacting the piled-up particles into a sheet-like layer on said surface; and sizing the preliminarily compacted sheet with simultaneous cooling.

15 Claims, 1 Drawing Figure

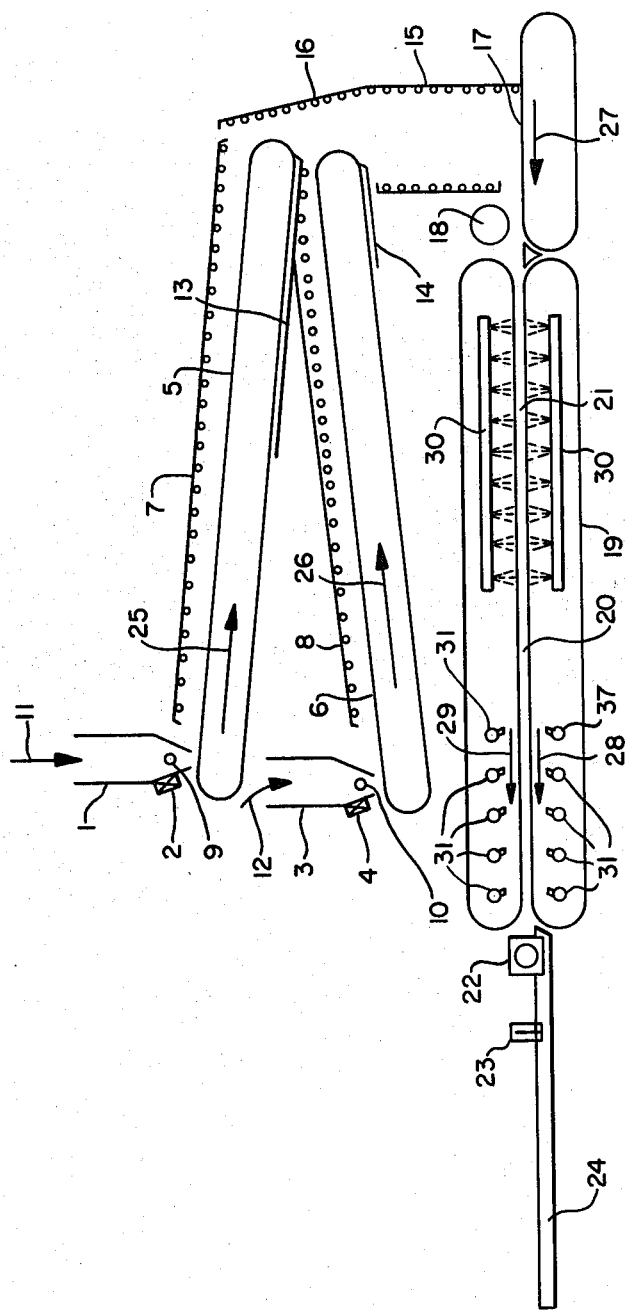

PROCESS FOR THE CONTINUOUS PRODUCTION OF A LENGTH OF STRATIFIELD MATERIAL FROM FOAM PARTICLES

The invention relates to a process for the continuous production of a length of stratified material from foam particles which particles, by supplying heat thereto, are at least superficially heated and by application of pressure are bonded to form a shaped component of the desired thickness and density and then cooled. An apparatus for conducting the process starts with a metering device for the foam particles, a heating device, and a sizing device with cooler unit formed between two mutually opposed, endlessly revolving belts.

German Pat. No. 1,629,321 discloses a process and apparatus for the continuous manufacture of foamed lengths of material from fully expanded synthetic resin beads, especially polystyrene. In this process, the foamed beads are subjected to controlled heating by hot air under atmospheric pressure to obtain a coherent, practically as yet unshaped mass and then the mass is first compressed to its final shape while maintaining the temperature and thereafter cooled off while maintaining the pressure. The heating of the beads with hot air takes place at temperatures of between 103° and 130° C.

This conventional process according to German Pat. No. 1,629,321 is especially suitable for the processing of polystyrene. However, if other thermoplastic synthetic resins are employed, such as, for example, polyolefin foam materials, PVC foam materials, or the like, then substantially higher temperatures are required to permit bonding by superficial melting of the foam particles and by mutual heat-sealing or adhesive bonding.

German Pat. No. 2,622,777 describes a process for the continuous production of a length of laminated material from elastic foam particles wherein the foam particles are glued to an existing layer of material by heating the layer and wherein, by subsequent heating of the glued-on foam particles on their surfaces until they become tacky, another layer of foam particles can be applied thereto and pressed thereagainst. This process makes it possible to manufacture sheeting of foam particles also in the sandwich construction with outside or interposed intermediate layers made from other materials.

It is an object of the invention to provide a continuous process for the production of lengths of stratified materials from expanded foam particles, such as shreds, chips, granules, or the like with the aid of heat wherein, in a single working step, laminated materials even of a relatively large layer thickness can be manufactured also exclusively from foam particles.

This object has been attained according to the invention by scattering foam particles onto a conveying zone and preheating these particles during their conveyance superficially to a temperature in the range from 100° to 160° C.; thereafter feeding the preheated foam particles to a free fall zone and heating them, during falling, superficially further to a temperature of 200° C. and thereabove, and piling them up at the end of the free fall and precompressing them into sheeting, whereafter the precompressed sheeting is sized, i.e., calibrated while simultaneously a cooling operation is conducted.

The process of this invention makes it possible to process foam particles requiring relatively high temperatures for heating same and for converting their surface into a plastic and thus tacky and/or weldable condition, into macerate (i.e., pressed particle) sheeting of relatively large thicknesses in one operating step. One essential idea of the invention is to be seen in that the heating of the foam particles takes place in two stages without the use of excess pressure, i.e., under atmospheric pressure. In the first preheating stage, when the foam particles have not as yet become too tacky on their surface by the heating process, the heating step is carried out while effecting a transporting operation by means of a conveyor belt. In the second heating stage leading to very high surface temperatures of the foam particles, during which the particles can already pass over into the plastic condition, the heating process is performed in free fall, i.e., there is no danger that the thus greatly heated particles will undesirably stick to a substrate. The foam particles, heated until they are bonded together, are then piled up to the desired height for the subsequent thickness of the sheeting to be manufactured; this is controlled by the velocity of a conveyor belt collecting the foam particles, and the particles are then compressed to the desired sheeting in two stages.

A pressure of $0.1-1$ kp/cm$^2$ is utilized for the preliminary compacting of the foam particles, this value being dependent on the thickness of the sheeting to be manufactured as well as on the desired degree of compacting. Similar considerations apply with respect to the pressure to be used during sizing operation, this pressure ranging preferably between 0.2 and 5.0 kp/cm$^2$, whereby the pressure in the sizing operation is always higher than in the preliminary compacting step.

Foam particles of differing density, size, color, and composition of the same or a different synthetic resin can be employed for the process of this invention. It is also possible to include, besides the foam particles, fillers and/or binders such as, for example, textile particles and textile fibers, as well as textile fabric shreds or the like, synthetic resin scrap in comminuted form.

Foam particles of polyolefin foam materials, especially crosslinked polyolefin foam materials can be used especially advantageously; these materials require relatively high temperatures until the materials are converted into an adhesive or weldable condition on their surfaces but thereafter result in durable and more or less compact chips sheeting, depending on the pressures applied and the chip qualities employed. The process of this invention can be used advantageously in all those cases where large amounts of shreds, scrap, edge cuttings, etc. are produced in the processing of foam materials, which amounts can be press-molded into sheet-like laminated materials by the process of this invention.

It is also possible in a further development of the process of this invention to bond the precompressed and/or sized sheeting unilaterally or bilaterally to a cover layer of compact or porous or perforated materials in the form of films, fabrics, nonwoven mats, or the like made up of expanded or unexpanded synthetic resins and/or metal, wood, textiles, paper, or similar materials.

The thus-produced macerate sheets are of a porous character and can be utilized, for example, as drainage panels or in a variegated fashion for insulation purposes in the construction field and in underground civil engineering applications. They are also suitable as protective mats, for example, on house walls, on roofs with walkways, etc. Depending on the field of usage of the thus-produced sheeting, it can be more or less permeable and, by lamination to appropriate cover layers, can be adapted to still further fields of usage. It is also possible to provide the thus-manufactured sheeting with a surface profile and/or to produce profiled rods; this is dependent exclusively on the corresponding shaping step by the sizing procedure, i.e., by the sizing device.

An especially advantageous embodiment of the process of this invention provides that the foam particles are scattered on at least two conveying zones or paths which are controllable mutually independently with respect to their conveying speed, and are fed to a joint falling zone. The utilization of two heatable conveying zones has the advantage that the capacity of the plant can be increased, on the one hand, and, on the other hand, the joining of the preheated foam particles in a combined falling zone results in an improved intermixing of the particles. Another essential aspect, however, is to be seen in that with the use of foam particles of differing properties and thus also of differing heating-up times, the conveyor belts can be correspondingly differently controlled. Foam particles having a higher weight per unit volume require a longer time period to be heated to a specific temperature than foam particles having a lower weight per unit volume, for example, those of polyolefin foam materials. When using such foam particles with varying weights per unit volume, it is now possible to drive the conveyor belt carrying foam particles having the higher weights per unit volume at a lower speed so that at the end of this conveyor belt, also these foam particles have reached the desired temperature; whereas the conveyor belt carrying the foam particles with the lower weight per unit volume can be operated at a higher velocity. Yet, a uniform product is obtained at the end of the process.

The finished layer thickness of the thus-produced sheeting is dependent on the piled-up height of the heated foam particles and on the subsequently applied pressures with the resultant compressions. The height of the layer thickness of the piled-up, heated foam particles is determined by the conveyor belt collecting the foam particles at the end of the falling zone. After an initial preliminary compacting step, the precompressed sheet is fed to a sizing zone which, during sizing, also takes over the cooling of the sheet. In the first section of the sizing zone, cooling is preferably performed directly with water, which flows through the sizing zone and through the porous, pressed macerate sheeting and, if desired, is collected and recycled; whereas air cooling is performed in the final section of the sizing zone, during which stage the sheeting is simultaneously dried. The finished sized and pressed sheeting, which is profiled in accordance with the design of the sizing belts, is thereafter edge-trimmed and cut conventionally into any desired formats.

An apparatus for conducting the process of this invention is advantageously equipped so that at least one endlessly rotating conveyor belt is provided with an associated heating unit which leads to a falling chute provided on its inner walls with heating units, these units being followed by a conveyor belt with a compacting device arranged thereafter. A preferred construction of the apparatus according to the invention provides that two endlessly rotating conveyor belts are present which have velocities controllable independently of each other. In this way, a rapid, uniform preheating of the foam particles is ensured and at the same time the completely heated foam particles are more uniformly intermixed and more uniformly spread onto the conveyor belt leading to the compacting stage. Moreover, several conveyor belts make it possible to use foam particles of varying properties, inasmuch as by a corresponding adjustment of the heaters and the conveying speeds of the conveyor belts, it is possible to provide in a controlled fashion the heating times and amounts of heat required for a specific heating of the foam particles.

An advantageous arrangement of the apparatus, especially with respect to space utilization, provides that the conveyor belts are arranged in superposition, namely, so that the belts constitute, preferably above the sizing device, practically a three-tier construction. In this connection, the conveyor belts can be arranged slightly inclined from the horizontal, entering at the falling chute (well) in maximally close superposition; whereas the belts diverge in a scissor-like fashion at the feed ends. This has the advantage that the feeding devices for the foam particles can be arranged at that location.

Since the heated foam particles become tacky, it is advantageous to construct all belts coming in contact with the heated foam particles as "Teflon" (polytetrafluoroethylene) belts, for example, and also to arrange stripper means for any adhering foam particles.

Additional embodiments of the apparatus of this invention are described in the claims and will be explained additionally hereinbelow with reference to the embodiment shown in the sole FIGURE of the accompanying drawing.

The FIGURE illustrates schematically the process of this invention and an apparatus according to this invention for conducting the process. It is possible by means of the process and apparatus to manufacture continuously endless sheets or profiled sheeting from foam particles, i.e. fully expanded foam particles, granules, chips, edge trimmings, etc., these sheets being fashioned to be more or less air-permeable, depending on the qualities of the foam particles utilized and on the degree of compacting. Sheets have a thickness of up to 100 mm and more can be manufactured with the process and apparatus of this invention.

From a storage bin for the foam particles, not shown, the foam particles are conveyed via conveying means, not illustrated, to the metering hoppers 1, 3; see arrows 11, 12. The metering hoppers can optionally be equipped with a vibrator 2, 4. Scattering rolls 9, 10 are arranged at the outlet end of the metering hoppers 1, 3, so that by changing the number of revolutions of the scattering rolls the dose of foam particles, i.e. the amount of foam particles introduced onto the subsequently arranged conveyor belts 5, 6, can be controlled. The endlessly rotating conveyor belts 5, 6 are provided for the transportation and simultaneous heating of the foam particles in the first heating stage superficially to temperatures of between 100° and 160° C. In the illustrated example two conveying paths or zones are provided and are arranged perpendicularly one above the other. The conveyor belts are preferably made of a "Teflon" fabric to prevent sticking of the foam particles. The speed of conveyor belts 5, 6 can be separately controlled so that the residence times of the foam particles and thus the heating times can be regulated in accordance with requirements of the product. The arrows 25, 26 show the rotating direction of the upper conveying surfaces of conveyor belts 5, 6. Heating units 7, 8, for example IR radiators, are arranged above the conveyor belts. The spacing of the radiators with respect to each other and with respect to the conveyor belts is adjustable. The conveyor belts 5, 6 run to the falling chute 15. The belts are slightly inclined from the horizontal so that they diverge scissor-like at the beginning so that the feeding means for the foam particles can be located at that location. Additionally, the conveyor belts 5, 6 are equipped with heat shields 13, 14 in the zone of the free-fall chute and in the zones where they are in close mutual proximity, so that the rotating belts 5, 6 are protected in the endangered regions against the rearward radiation of the heaters 7, 8. In the area of the belt return at the free-fall chute, the heat shields are furthermore equipped with stripping means, not shown in detail, for adhering foam particles.

The foam particles drop, in the region of the chute 15, from the conveyor belts 5, 6 in free fall through the chute onto the endlessly rotating conveyor belt 17 at the end of the chute. While falling through the chute, a uniform, random intermixing of the heated foam particles takes place. Moreover, the chute, which is preferably constructed to be laterally closed off, for example in a rectangular shape or also in a different circular configuration, is equipped along the inside walls with heating devices 16, for example IR radiators. Thus, the foam particles dropping through the free-fall chute are additionally superficially heated; temperatures are reached here of up to 200° C. and more, depending on the quality of the foam particles. At the end of the chute, the rotating conveyor belt 17 is arranged, which is likewise a "Teflon" belt and the conveying surface rotates in the direction of arrow 27. The velocity of this conveyor belt, which also exerts a collecting function for the heated foam particles dropped thereon, can be regulated. Depending on the velocity, a certain height of the piled-on foam particles results, the finished thickness of the sheeting to be produced being dependent on this height. The heated foam particles piled upon the conveyor belt 17 are then subjected, at the end of conveyor belt 17, to a preliminary compacting step by means of the roll 18. The nip between roll 18 and conveyor belt 17 is adjustable, depending on the desired thickness of the sheeting to be manufactured. For example the size of the nip may be between 40 and 60% of the height of the piled-on foam particles.

The preliminarily compacted sheet then enters directly into a sizing and cooling zone wherein the sizing zone 21 is constituted by the two endlessly rotating chain belts 19, 20, having opposing surfaces rotating in the direction of arrows 28, 29. The speed of the belts 19, 20 is likewise controllable, namely in adaptation to the velocity of the conveyor belt 17. The thickness, i.e. the spacing between the chain belts 19, 20, is likewise adjustable. Cooling is effected through the interspaces of the chain belts, for example with water sprays from spray pipe 30 arranged above, and beneath the sheet and can be recovered in a bottom trough, not shown. In the last section of the sizing zone, air-jet nozzles 31 are preferably arranged, whereby on the one hand the sheet is dried and additionally further cooled, e.g. at 40° to 60° C. at the surfaces of the sheet.

After leaving the sizing zone, the finished sheeting is trimmed along the edges with a cutter 22 in the longitudinal extension and is optionally divided and thereafter cut to size by means of a transverse sawing means 23. After the cutting step, the cut-off panels slide away from the sheeting over the table 24 and are taken off therefrom.

The arrangement of the sizing zone and the conveyor belts 5, 6 in superimposed, tier-like fashion as shown in the embodiment of the FIGURE is especially space-saving. However, it is just as well possible to dispose the conveyor belts 5, 6 in one plane, and it is likewise feasible to associate even a third conveyor belt with the falling chute, if desired, for fillers or binders to be included in the final sheeting product.

What is claimed is:

1. A process for the continuous production of a sheeting of stratified material from synthetic resin foam particles which are capable, upon the application of heat, of being bonded together with the use of pressure which comprises scattering foam particles onto a conveying means, preheating the foam particles during conveyance, superficially to a temperature in the range between 100° and 160° C.; thereafter feeding the thus-preheated foam particles to means defining a free falling zone, causing the preheated particle to freefall within said zone, further heating the particles during falling, to a temperature of at least 200° C., and, at the end of the free fall, piling up the particles on a support surface, compacting the piled-up particles into a sheetlike layer and then sizing the preliminarily compacted sheet with simultaneous cooling.

2. A process according to claim 1, wherein a pressure of 0.1–1.0 kp/cm$^2$ is exerted during the preliminary compacting of the foam particles.

3. A process according to claim 1 or 2, wherein during sizing of the sheet, a pressure is exerted of 0.2–5.0 kp/cm$^2$.

4. A process according to claim 1, wherein the foam particles have differing densities and are made of the same or a different synthetic resin.

5. A process according to claim 1, wherein the foam particles are made of polyolefin foam materials, especially crosslinked polyolefin foam materials.

6. A process according to claim 1, wherein the foam particles are admixed with fillers and binders prior to being compacted into the sheet-like layer.

7. A process according to claim 1, wherein the preliminarily compacted sheet is bonded with a cover layer made of at least one material selected from the group consisting of synthetic resin, metal, wood, textile material, and paper.

8. A process according to claim 1, wherein the foam particles are scattered on at least two conveying paths controllable mutually independently with respect to their conveying speed, and are fed to a common free-falling zone.

9. A process according to claim 1, wherein the sheet is, in the initial phase of the sizing step, cooled directly with water and, in the final phase of the sizing step, is cooled and dried by means of air.

10. A process according to claim 1, wherein the foam particles are admixed with binders prior to being compacted into the sheet-like layer.

11. A process according to claim 1, wherein the foam particles are admixed with fillers prior to being compacted into the sheet-like layer.

12. A process according to claim 7, wherein the cover layer is in the form of a film.

13. A process according to claim 7, wherein the cover layer is in the form of a fabric.

14. A process according to claim 7, wherein the cover layer is in the form of a non-woven mat.

15. A process according to claim 1, wherein the compacted sheet is bonded bilaterally with said cover layer.

* * * * *